(12) United States Patent
Dasadi et al.

(10) Patent No.: US 10,449,990 B2
(45) Date of Patent: Oct. 22, 2019

(54) CLAMP MECHANISM

(71) Applicant: TRW Limited, Solihull, West Midlands (GB)

(72) Inventors: Raghavendra Dasadi, Telangana (IN); Slawomir Kwasny, Czechowice-Dziedzice (PL)

(73) Assignee: TRW Limited, Solihull, West Midlands (GB)

( * ) Notice: Subject to any disclaimer, the term of this patent is extended or adjusted under 35 U.S.C. 154(b) by 3 days.

(21) Appl. No.: 15/309,216

(22) PCT Filed: May 8, 2015

(86) PCT No.: PCT/GB2015/051354
§ 371 (c)(1),
(2) Date: Nov. 7, 2016

(87) PCT Pub. No.: WO2015/170110
PCT Pub. Date: Nov. 12, 2015

(65) Prior Publication Data
US 2017/0072987 A1    Mar. 16, 2017

(30) Foreign Application Priority Data
May 8, 2014   (GB) .................................. 1408170.7

(51) Int. Cl.
*B62D 1/184*   (2006.01)
*B62D 1/185*   (2006.01)

(52) U.S. Cl.
CPC ............... *B62D 1/184* (2013.01); *B62D 1/185* (2013.01)

(58) Field of Classification Search
CPC ......... B62D 1/184; B62D 1/185; B62D 1/187
See application file for complete search history.

(56) References Cited

U.S. PATENT DOCUMENTS 5,570,610 A * 11/1996 Cymbal ................. B62D 1/184
                                                          74/493
5,921,577 A * 7/1999 Weiss ..................... B62D 1/184
                                                          280/775
(Continued)

FOREIGN PATENT DOCUMENTS

DE      102012100486 B3    2/2013
JP         2008265647 A   11/2008
(Continued)

OTHER PUBLICATIONS

Patent Acts 1977: Search Report under Section 17(5), Application No. GB1408170.7 dated Oct. 30, 2014.
(Continued)

*Primary Examiner* — Paul N Dickson
*Assistant Examiner* — Timothy Wilhelm
(74) *Attorney, Agent, or Firm* — MacMillan, Sobanski & Todd, LLC (57) ABSTRACT

A steering column assembly includes a clamp mechanism comprising a clamp pin that passes through an opening in a shroud of the steering column assembly and an opening in a bracket that supports the shroud of the steering column assembly. A first reaction member is secured to one end of the pin and a second reaction member secured to another end of the clamp pin, the reaction members defining a length of clamp pin between them that passes through the opening in the shroud and the opening in the support bracket. A cam mechanism has a fixed part and a moving part, each having an opening through which they are threaded onto the clamp pin between one of the reaction members and the support bracket. The moving cam part is connected to a lever and free to rotate around the clamp pin as the lever is rotated, the fixed cam part being prevented from rotation around the clamp pin, a cam surface of the fixed part being in contact with a cam surface of the rotating part and configured such
(Continued)

that rotation of the rotating cam part is converted into an axial movement of the fixed cam part resulting in a change in the overall length of the cam mechanism. The cam steering column assembly is configured so that the increase in length of the cam mechanism when in a clamped position causes the bracket to be clamped to the shroud, and the assembly further comprising a damping member that is fixed to at least one of the clamp pin, the fixed cam and the moving cam so that the resilient damping member is compressed as the cam mechanism moves to the unclamped condition so as to damp the movement of the cam mechanism.

10 Claims, 8 Drawing Sheets (56) References Cited

U.S. PATENT DOCUMENTS

| | | | | |
|---|---|---|---|---|
| 6,581,965 | B2 * | 6/2003 | Lutz | B62D 1/184 |
| | | | | 180/78 |
| 6,952,979 | B2 * | 10/2005 | Cartwright | B62D 1/184 |
| | | | | 280/775 |
| 7,010,996 | B2 * | 3/2006 | Schick | B62D 1/184 |
| | | | | 280/775 |
| 7,097,205 | B2 * | 8/2006 | Camp | B62D 1/184 |
| | | | | 280/775 |
| 7,415,908 | B2 * | 8/2008 | Zernickel | B62D 1/184 |
| | | | | 280/775 |
| 8,413,541 | B2 * | 4/2013 | Davies | B62D 1/184 |
| | | | | 280/777 |
| 8,590,932 | B2 * | 11/2013 | Dietz | B62D 1/184 |
| | | | | 280/775 |
| 8,707,818 | B2 * | 4/2014 | Okada | B62D 1/184 |
| | | | | 280/775 |
| 8,882,147 | B2 * | 11/2014 | Schnitzer | B62D 1/195 |
| | | | | 280/775 |
| 8,991,863 | B2 | 3/2015 | Hahn et al. | |
| 9,079,612 | B2 * | 7/2015 | Wilkes | B62D 1/184 |
| 9,150,240 | B2 * | 10/2015 | Schnitzer | F16F 7/06 |
| 9,168,945 | B2 * | 10/2015 | Hiesse | B62D 1/184 |
| 9,260,131 | B2 * | 2/2016 | Wilkes | B62D 1/184 |
| 9,428,212 | B2 * | 8/2016 | Okada | F16D 41/064 |
| 9,840,270 | B2 * | 12/2017 | Tomiyama | B62D 1/184 |
| 2003/0172765 | A1 * | 9/2003 | Heiml | B62D 1/181 |
| | | | | 74/493 |
| 2004/0057786 | A1 * | 3/2004 | Heiml | B60N 2/23 |
| | | | | 403/373 |
| 2005/0047701 | A1 * | 3/2005 | Schick | B62D 1/184 |
| | | | | 384/623 |
| 2005/0178231 | A1 * | 8/2005 | Schick | B62D 1/184 |
| | | | | 74/493 |
| 2009/0084218 | A1 * | 4/2009 | Bodtker | B62D 1/187 |
| | | | | 74/493 |
| 2014/0294496 | A1 * | 10/2014 | Gardiner | F16B 7/1454 |
| | | | | 403/374.2 |
| 2014/0318304 | A1 * | 10/2014 | Hahn | B62D 1/184 |
| | | | | 74/493 |
| 2015/0353122 | A1 * | 12/2015 | Davies | B62D 1/184 |
| | | | | 24/542 |
| 2015/0360712 | A1 * | 12/2015 | Baumeister | B62D 1/184 |
| | | | | 403/53 |

FOREIGN PATENT DOCUMENTS

| | | |
|---|---|---|
| JP | 2012031383 A | 2/2012 |
| WO | 2012/046075 A | 4/2012 |
| WO | 2012/172334 A1 | 12/2012 |
| WO | 2013001284 A1 | 1/2013 |
| WO | 2013097922 A1 | 7/2013 |
| WO | 2014/114674 A1 | 7/2014 |

OTHER PUBLICATIONS

International Search Report and the Written Opinion, Application No. PCT/GB2015/051354 filed May 8, 2015, dated Jul. 24, 2015.

* cited by examiner

CLAMP MECHANISM

CROSS-REFERENCE TO RELATED APPLICATIONS

This application is a national stage of International Application No. PCT/GB2015/051354, filed 8 May 2015, the disclosures of which are incorporated herein by reference in entirety, and which claimed priority to Great Britain Patent Application No. 1408170.7, filed 8 May 2014, the disclosures of which are incorporated herein by reference in entirety.

BACKGROUND OF THE INVENTION

This invention relates to improvements in clamp mechanisms for use in securing a steering column shroud in position within a vehicle.

It is known to provide a steering column assembly for a vehicle which comprises a steering column shaft supported by one or more bearings within a shroud. The shaft connects a steering wheel at one end to the road wheels of the vehicle, usually through a steering rack. The shroud is fixed to the vehicle through a support bracket. To enable the steering to be adjusted for rake (or height) the shroud is often movable relative to the support bracket, with a clamp mechanism being provided that in a clamped position prevents movement of the shroud relative to the bracket. The shroud is also, in some cases, adjustable for reach by allowing one part of the shroud to move telescopically relative to another. The same clamp mechanism that secures the shroud to the bracket usually also prevents the shroud from being adjusted for reach when in the clamped position.

Many forms of clamp mechanism are known in the art. In one arrangement an elongate clamp pin passes through a slot in the bracket and a slot in the shroud, the pin having fixed or adjustable end stops, or reaction members, at each end to define a fixed length of pin between them. A cam mechanism which is adjustable for length is located on the pin between one of the ends stops and the part of the bracket with the slot. When the cam mechanism is at its shortest length the bracket is only loosely connected to the shroud allowing the shroud to be moved relative to the bracket. When it is at its longest length the bracket and shroud are clamped together as the cam mechanism pushes against the end stop and bracket, so the shroud cannot move relative to the bracket.

The cam mechanism is operated by a lever. Rotation of the lever rotates a part of the cam mechanism which converts that movement into the linear movement associated with a change in length. To move the bracket and shroud apart when unclamped, a spring is provided. This spring applies a force to the bracket arm which can in some cases move the cam rapidly to the end of its travel where movement will come to an abrupt stop.

BRIEF SUMMARY OF THE INVENTION

According to a first aspect the invention provides a steering column assembly that includes a clamp mechanism comprising:
  a clamp pin that passes through an opening in a shroud of the steering column assembly and an opening in a bracket that supports the shroud of the steering column assembly,
  a first reaction member secured to one of the pin and a second reaction member secured to another end of the clamp pin, the reaction members defining a length of clamp pin between them that passes through the opening in the shroud and the opening in the support bracket and
  a cam mechanism having a fixed part and a moving part, each having an opening through which they are threaded onto the clamp pin between one of the reaction members and the support bracket,
  the moving cam part being connected to a lever and free to rotate around the clamp pin as the lever is rotated, the fixed cam part being prevented from rotation around the clamp pin, a cam surface of the fixed part being in contact with a cam surface of the rotating part and configured such that rotation of the rotating cam part is converted into an axial movement of the fixed cam part resulting in a change in the overall length of the cam mechanism,
  the cam steering column assembly being configured so that the increase in length of the cam mechanism when in a clamped position causes the bracket to be clamped to the shroud,
  characterised by further comprising a damping member that is fixed to at least one of the clamp pin, the fixed cam and the moving cam so that the resilient damping member is compressed as the cam mechanism moves to the unclamped condition so as to damp the movement of the cam mechanism.

By damping the movement of the moving cam the movement any undesirable noise that would otherwise arise as the cam mechanism abruptly reached the end of travel can be eliminated or reduced.

The damping member may be resilient and may be compressed on movement of the clamp mechanism towards the unclamped position. It may be compressed by engagement with at least one of the fixed cam part, the bracket and the shroud.

Additionally or alternatively damping may be achieved due to friction between the damping member and at least one of the fixed cam part, the moving cam part, the bracket and the shroud.

The resilient member may be located between the fixed cam part and the moving cam part.

The resilient member may be located between the fixed cam part and the bracket or shroud.

The damping member may be located between the clamp pin and the shroud or bracket.

In a preferred arrangement, one of the cam parts includes a cavity and the other cam a protrusion that extends axially along the clamp pin and moves into the cavity as the cam moves from a locked to an unlocked condition, and the resilient member is located within the cavity and is compressed by the fixed cam or moving cam or both as it reaches the unlocked condition.

The cam mechanism may therefore have a greater length, measured along the axis of the clamp pin, when in the clamped position than the length when in the unclamped position.

The cavity may comprise an annular well that has an axis coincident with the axis of the clamp pin, and the protrusion may comprise a generally conical protrusion that also has an axis coincident with the axis of the clamp pin.

The base of the well may be provided with an opening through which the clamp pin is threaded. Similarly, the conical protrusion may be provided with a through bore along its axis through which the clamp pin is threaded.

The resilient member may comprise a resilient annular ring that it located in the well, or is secured to the protrusion which is compressed as the protrusion moves further into the well.

The ring may be secured to the surface of the fixed cam or to the moving cam or to the clamp pin. It may be located in an annular recess that extends around a part of the moving cam.

The ring may comprise a coating that is provide on the surface of the well or protrusion.

Where the moving cam moves through a set range of angles from unclamped to clamped, the resilient member may only be compressed during a part of the that range. It may only be compressed during the last half or quarter of the range of angles.

The contacting faces of the cam portions may be arranged so that that cam mechanism goes "over centre" as it approaches the locked condition. The resilient member may be compressed as the cam mechanism starts to approach that centre, and then becomes less compressed as it moves over centre.

In an alternative arrangement the resilient member is fixed to the clamp pin so that as the fixed cam portion moves axially along the clamp pin when moving to the unclamped position it is compressed.

The fixed cam may include an annular well that extends around the clamp pin into which the resilient member is compressed.

The resilient member may comprise a ring that has an inner bore that is an interference fit or is threaded to the clamp pin, the ring being tapered from one end to the other that compliments a taper provided in the well of the fixed cam portion.

Other advantages of this invention will become apparent to those skilled in the art from the following detailed description of the preferred embodiments, when read in light of the accompanying drawings.

BRIEF DESCRIPTION OF THE DRAWINGS

FIG. 3 is a view is taken along the line A-A of the cam mechanism of the assembly of FIG. 1 in (a) a clamped and (b) an unclamped position;

FIG. 4 is a view is taken along the line A-A of the cam mechanism of the assembly of FIG. 1 in (a) a clamped and (b) an unclamped position;

FIG. 5 is a view is taken along the line A-A of the cam mechanism of the assembly of FIG. 1 in (a) a clamped and (b) an unclamped position;

FIG. 6 is a view is taken along the line A-A of the cam mechanism of the assembly of FIG. 1 in (a) a clamped and (b) an unclamped position.

DETAILED DESCRIPTION OF THE INVENTION

Figure 1:
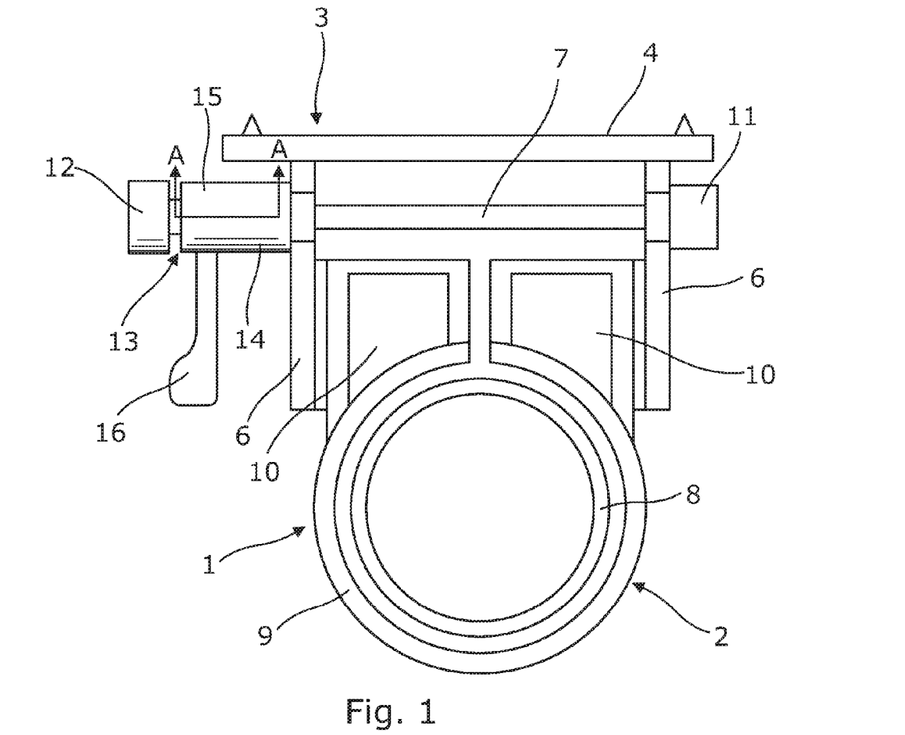
FIG. 1 is a view in cross section of a simple steering column assembly.
Figure 2:
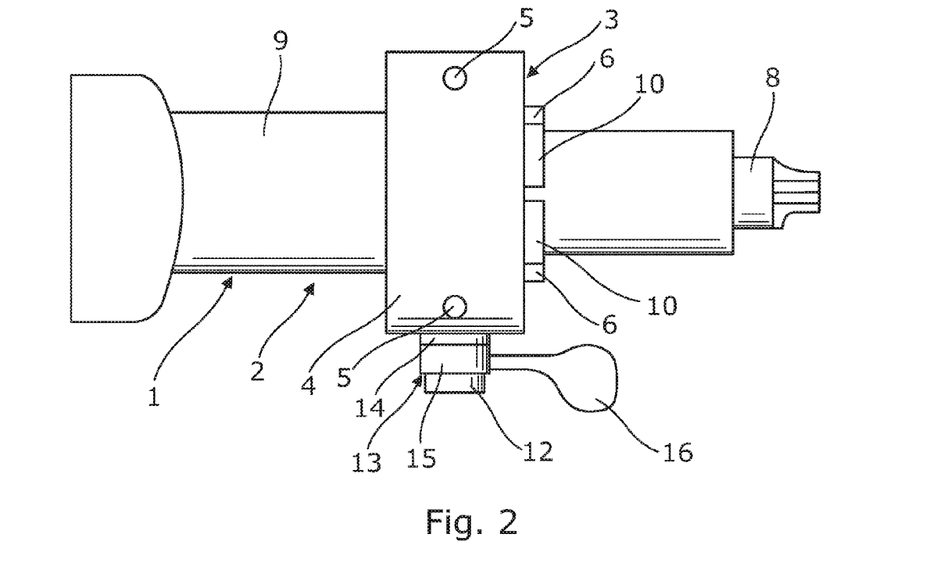
FIG. 2 is a view in plan of the steering assembly of FIG. 1.

As shown in FIG. 1, a steering column assembly 1 comprises a steering column shaft (not shown) supported by one or more bearings (not shown) within a shroud 2. The shaft is provided with splines that enable it to be connected to a steering wheel (not shown) at one end. At the other end the shaft can be connected to the road wheels of the vehicle (not shown), usually through a steering rack or other gearbox assembly. Where the steering is electrically assisted, the shaft may be connected to a motor through a gearbox.

The shroud 2 is fixed to the vehicle through a support bracket 3. The bracket 3 comprises a base plate 4 that is provided with two holes through which fixing bolts 5 are passed. Two arms 6 depend from the base plate 4, one each side of the shroud 2. Each arm 6 includes a slot (not shown) that extends generally vertically along the arm 6. A clamp pin 7 passes through the slots. The shroud 2 is located between the arms 6.

The shroud 2 in the embodiment of FIG. 1 has an upper part 8 and a lower part 9. Each part 8, 9 comprises a hollow tube, with one tube fitted slidably with the other. As shown the tube 8 nearest the steering wheel end of the shaft, the upper part 8 is located inside the lower part 9. In other embodiments this could be the other way around. The lower part 9 is provided with a slot (not shown) on its upper surface, and two rails 10 are provided that extend down the upper surface of the lower part 9 on opposing sides of the slot. Each rail 10 is provided with an elongate slot that runs along the rail 10 parallel to the axis of the shroud 2, and the clamp pin 7 also passes through these slots.

The shroud 2 is therefore secured to the bracket 3 by the clamp pin 7. A clamp mechanism is provided as will now be described. When unclamped this allows the pin 7 to move along the slots, giving a range of movement of the shroud 2 for reach and rake defined by the length of the slots. When clamped, the bracket arms 6 are squeezed together onto the rails 10. This clamps the rails 10 to the bracket 4 so the shroud 2 will not move accidentally for rake. At the same time, the slot in the lower shroud part 9 is closed up slightly, which presses the lower shroud part 9 onto the upper shroud part 8. This prevents accidental movement of the shroud 2 for reach.

The clamp mechanism comprises a clamp pin 7, with a first reaction member 11 secured to one end of the pin 7 and a second reaction member 12 secured to the other end of the pin 7, either side of the clamp bracket arms 6. The position of the reaction members 11, 12 along the clamp pin 7 defines a length of pin 7 between them. One reaction member 11 comprises a clamp pin head, and the other an adjustable nut with a stiff thread 12, allowing this length to be set during assembly.

Figure 3A:
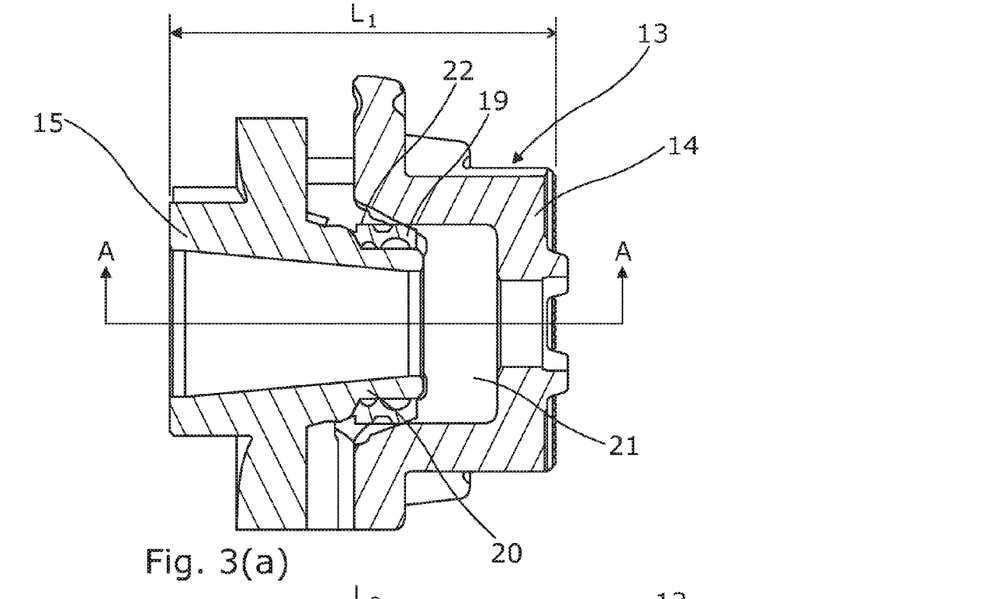

Threaded onto the clamp pin 7 between the adjustable head 12 and the outside of one arm 6 is a cam mechanism 13 having a fixed part 14 and a moving part 15, each having an opening through which they are threaded onto the clamp pin 7. The moving cam part 15 is connected to a lever 16 and free to rotate around the clamp pin 7 as the lever 16 is rotated, the fixed cam part 14 being prevented from rotation around the clamp pin 7, a cam surface of the fixed part 14 being in contact with a cam surface of the rotating part 15 and configured such that rotation of the rotating cam 15 is converted into an axial movement of the fixed cam 14 resulting in a change in the overall length of the cam mechanism 13. In a clamped position, as shown in FIG. 3(*a*) it has length L1 that is greater than the length L2 when in the unclamped position.

In an unclamped position, the cam mechanism 13 leaves enough length of clamp pin 7 between the bracket arms 6 for them to only loosely engage the respective adjacent arms 6. When in the clamped position, where the cam mechanism 13 is longer, the length of clamp pin 7 between the arms 6 is reduced and this causes the bracket arms 6 to be squeezed onto the shroud rails 10.

Figure 4A:
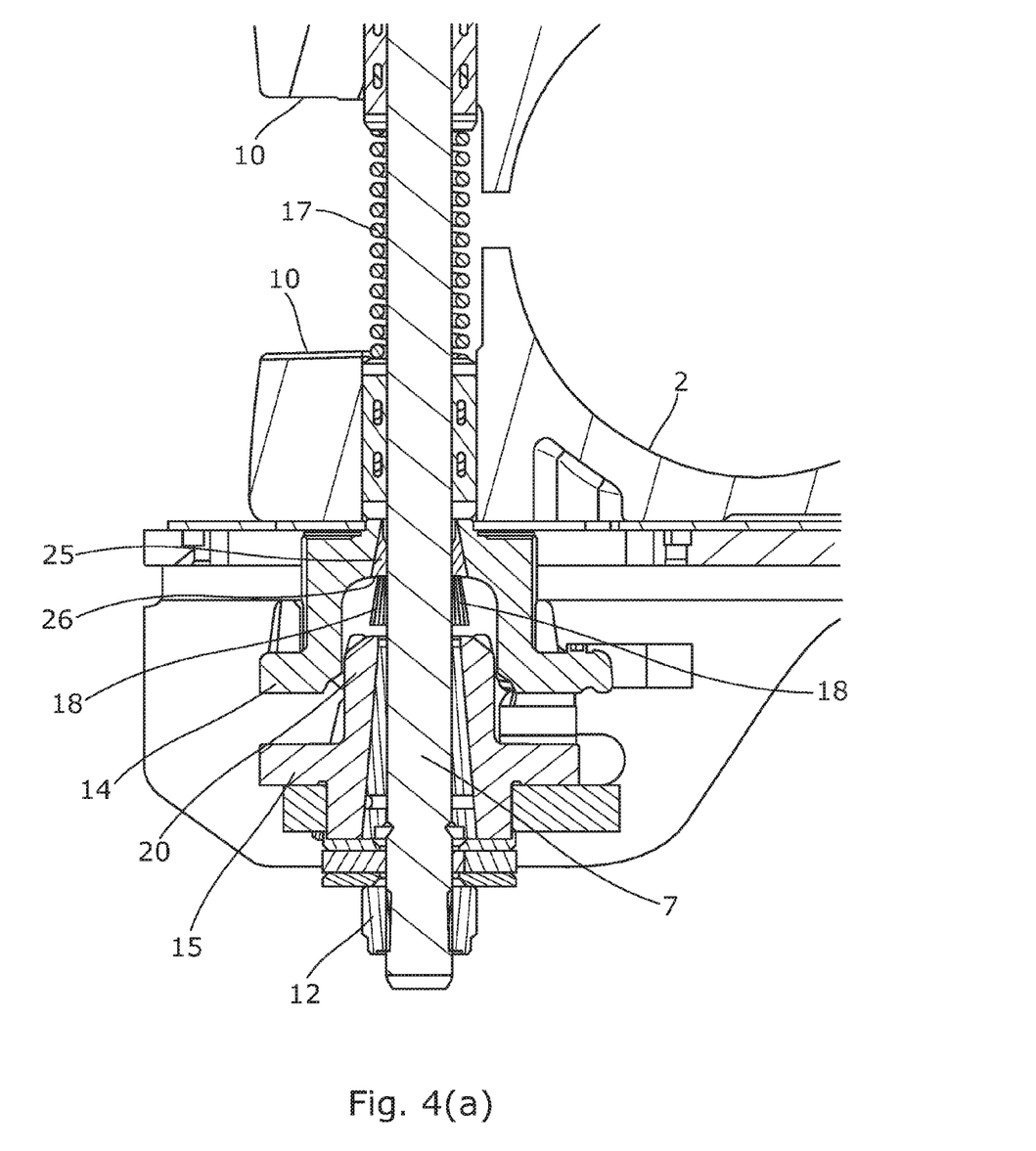

A spring 17 is provided, as shown in FIG. 4(*a*) that biases the fixed cam part 14 axially away from the bracket arm 6.

This spring 17 is compressed as the clamp mechanism is clamped and helps to move the cam mechanism 13 away from the bracket 4 when unclamped.

The applicant has appreciated that the spring force can cause the cam mechanism 13 to move rapidly to the end of its travel when unclamping, especially if the lever 16 is turned with force and then dropped. When the cam mechanism 13 reaches the end of travel this movement abruptly stops.

FIGS. 3 to 6 show in detail three different arrangements of clamp mechanism 13 that can ameliorate issues associated with the abrupt stopping of the movement. In each one a resilient damping member 18 is provided that is fixed to one of the clamp pin 7, fixed cam 14 or moving cam 15. The resilient damping member 18 is compressed as the cam mechanism 13 moves to the unclamped position so as to damp the movement of the cam mechanism 13. The applicant has found that this can reduce the noise that would otherwise occur as the end of travel is reached.

Figure 3B:
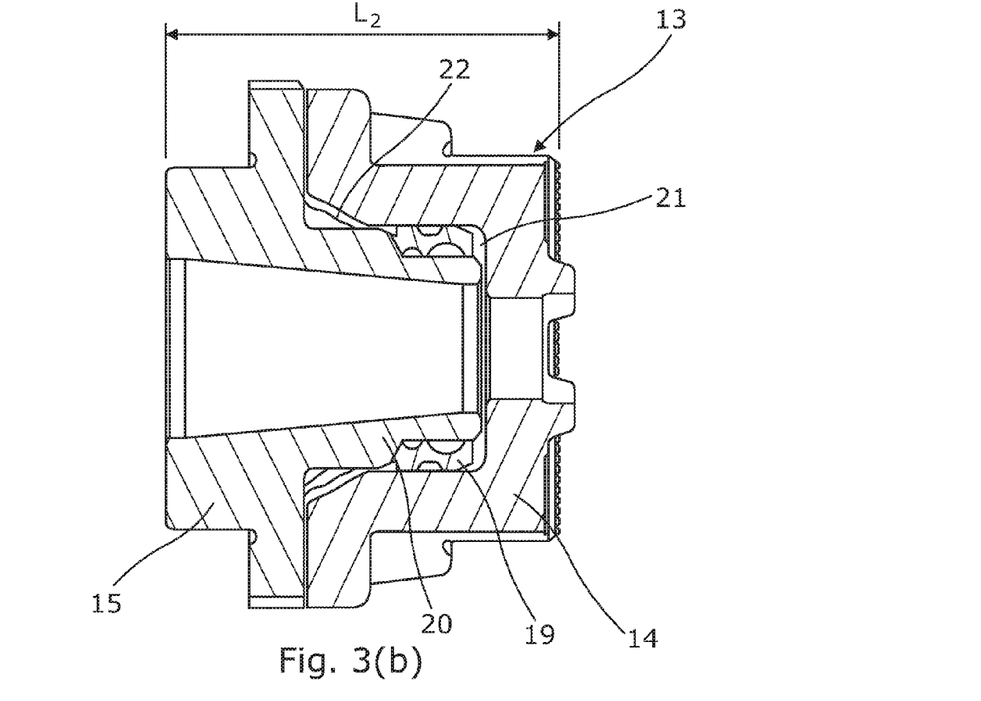

In the embodiment of FIGS. 3(a) and (b) the resilient member 18 comprises a ring 19 of resilient material that is overmolded onto an end of a protrusion 20 on the moving cam part 15. The material can therefore compress in a direction orthogonal to the axis of the clamp pin, i.e. it can be squashed towards the clamp pin axis. To further increase the resilience, a portion of the protrusion that lies below the ring is cut away around a circumference of the protrusion, so the ring and material below it can be pressed into the cut away. The protrusion in this example is an integral formed with the part of the cam that defines the cam surface which may comprise one or more ramps. This may comprise a metal block or hard plastic block.

The protrusion fits 20 within a well 21 in the fixed cam part 14 when in the unclamped position, and rests partly outside of the well 21 when in the clamped position. The open end 22 of the well 21 is tapered outwards slightly. As the fixed cam part 14 and moving cam part 15 move together, the protrusion 20 and ring 19 move into the well 21. The ring 19 diameter at rest is larger than the inner diameter of the well 21 so that the ring 19 is compressed when entering the well. This provides damping. The tapered end 22 of the well 21 helps smoothly guide the ring 19 into the well 21, and to control the rate of increase of compression of the ring 19.

Figure 4B:
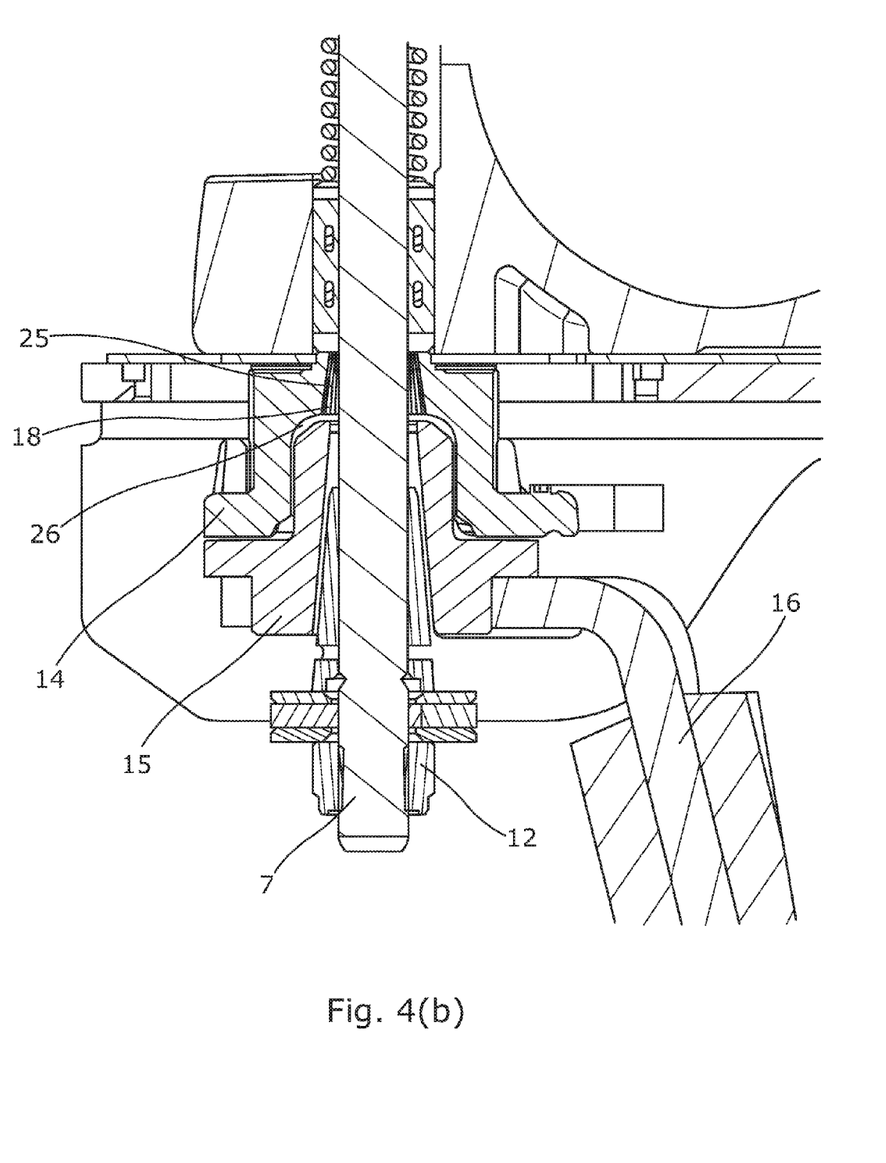

In an alternative embodiment shown in FIGS. 4(a) and (b) the resilient member 18 comprises an annular ring or bush, for example of rubber or plastic, that is fixed to the clamp pin 7 between the fixed 14 and moving cam parts 15. The bush 18 is press fit onto the clamp pin 7 so that it cannot move axially along the clamp pin 7. The fixed cam part 14, which can move axially along the clamp pin 7, has a hole 25 through which the pin 7 is threaded. This hole 25 is oversized and provided with a taper so that it has a larger size at the end 26 nearest the moving cam 14 and smaller size moving away from that. The annular ring 18 is also tapered with a complimentary shape to the hole 25. As the cam mechanism 13 moves to the unclamped position, the ring 23 moves into the hole 25 and as is compressed between the clamp pin 7 and walls of the hole 25.

Figure 5A:
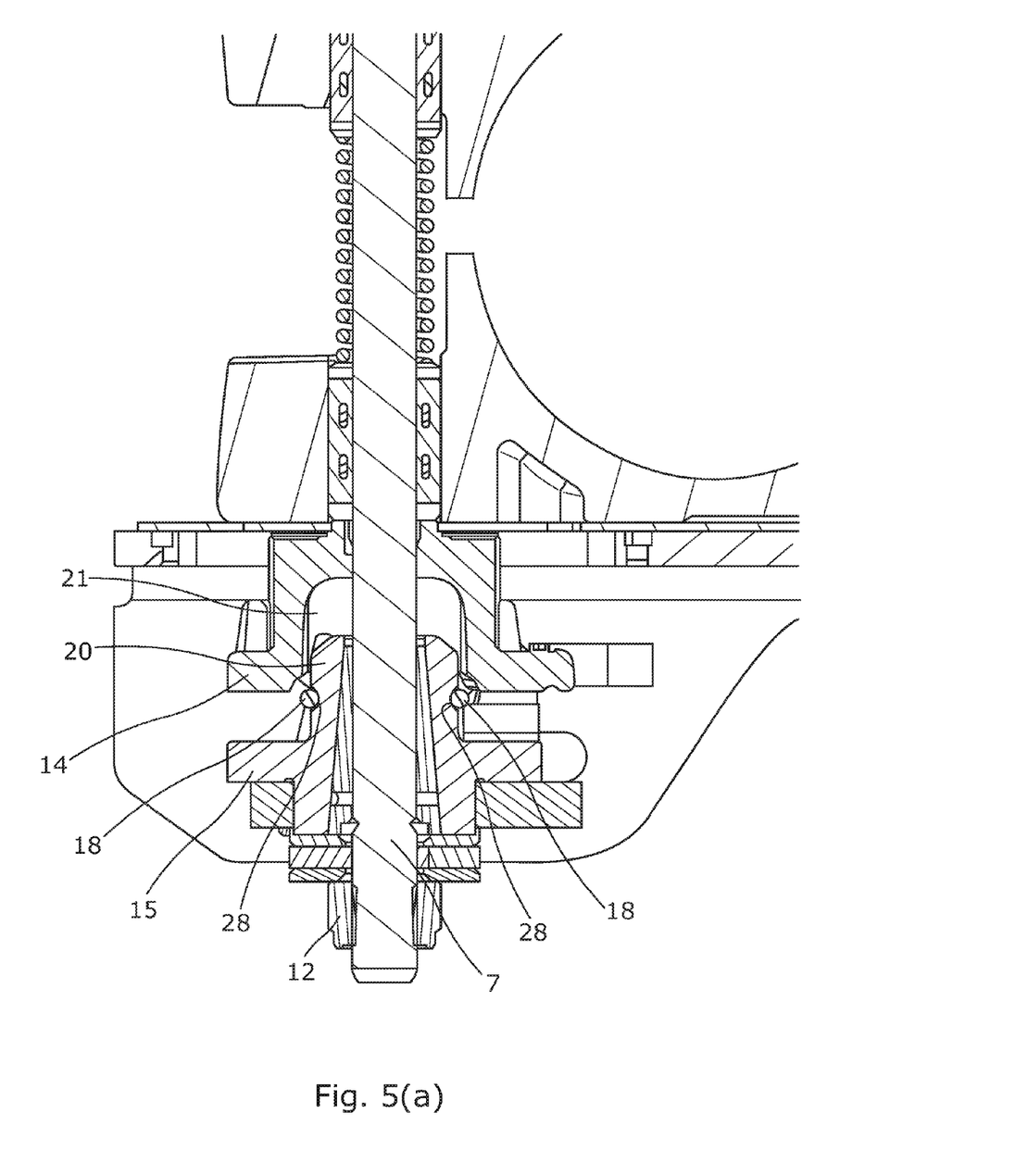
Figure 5B:
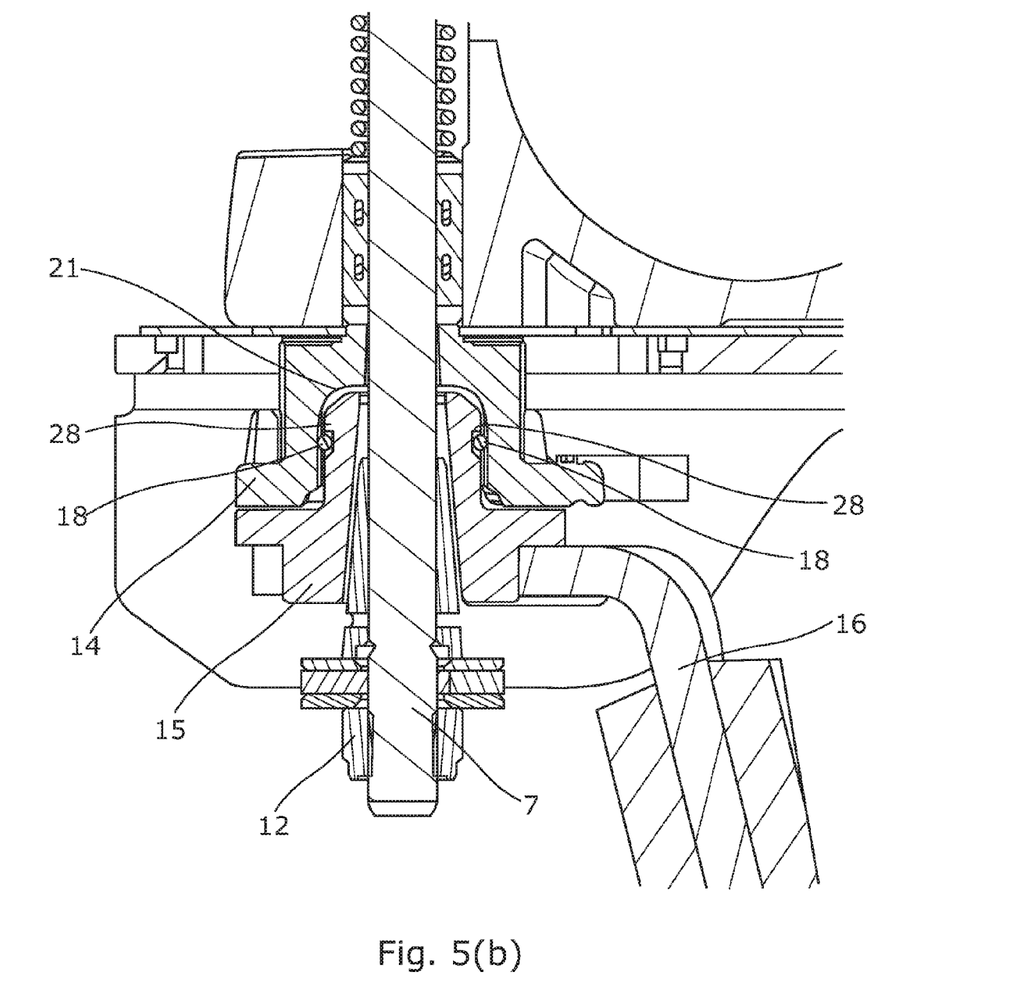

FIGS. 5(a) and (b) show an alternative arrangement similar to FIG. 3. A resilient member 18 is provided in the form of an annular ring that sits in an annular groove 28 located around a protrusion 20 of the moving cam 15 that extends towards the fixed cam 14. The axis of the ring 18 is aligned with the axis of the clamp pin 7 in this embodiment. In a similar manner to that of FIG. 3 the protrusion 20 extends into a well 21 that is formed in the fixed cam part 14, and is compressed as they move together. The ring 18 is both resilient but also of a relatively high friction material. In addition to damping due to compression, the movement is also controlled by friction between the ring 18 and the fixed cam part 14.

Figure 6A:
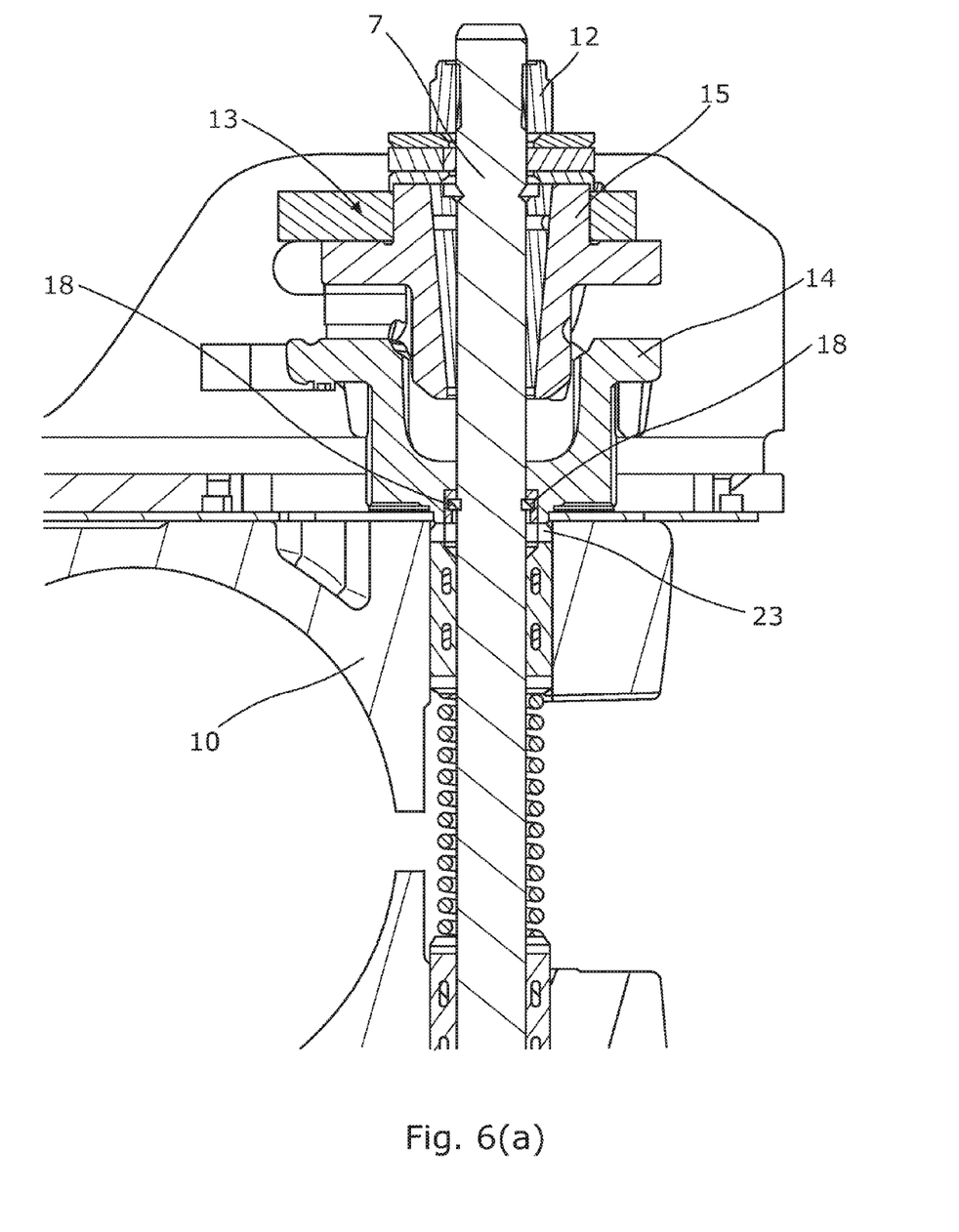
Figure 6B:
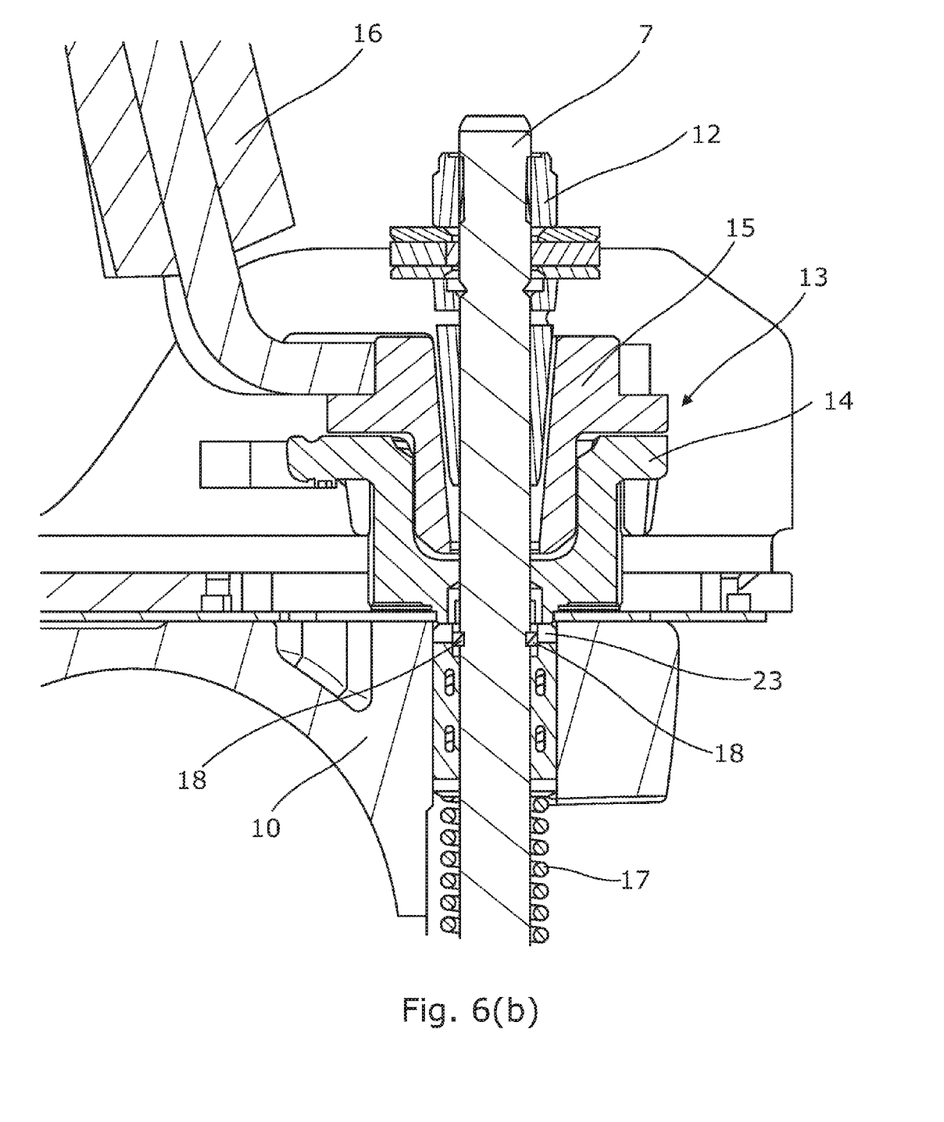

FIGS. 6(a) and (b) show a further embodiment in which the resilient damping member 18 comprises an annular bush or ring that is a press fit onto the clamp pin 7 similar to that of FIG. 4. However, in this embodiment it is located in a region of the clamp pin 7 that is spaced apart from the cam mechanism 13. As the cam mechanism 13 moves to the unclamped position, the ring 18 is pulled or pushed into an opening 23 of the rail 10 of the shroud 2. Again, it is compressed as it moves into the opening 23 to help decelerate movement of the clamp assembly 1.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A steering column assembly that includes a clamp mechanism comprising:
   a clamp pin that passes through an opening in a shroud of the steering column assembly and an opening in a support bracket that supports the shroud of the steering column assembly,
   a first reaction member secured to one end of the clamp pin and a second reaction member secured to another end of the clamp pin, the reaction members defining a length of the clamp pin between them that passes through the opening in the shroud and the opening in the support bracket and
   a cam mechanism having a fixed part and a moving part, each having an opening through which they are threaded onto the clamp pin between one of the reaction members and the support bracket,
   the moving cam part being connected to a lever and free to rotate around the clamp pin as the lever is rotated, the fixed cam part being prevented from rotation around the clamp pin, a cam surface of the fixed cam part being in contact with a cam surface of the moving cam part and configured such that rotation of the moving cam part is converted into an axial movement of the fixed cam part resulting in a change in an overall length of the cam mechanism,
   the steering column assembly being configured so that an increase in length of the cam mechanism when in a clamped position causes the support bracket to be clamped to the shroud, and
   a damping member that is fixed to at least one of the clamp pin, the fixed cam part and the moving cam part so that the damping member is compressed by movement of the cam mechanism to the unclamped condition so as to damp the movement of the cam mechanism, and in which the damping member is compressed by direct engagement with at least one of the fixed cam part, the support bracket and the shroud.

2. The steering column assembly according to claim 1 in which the damping member is resilient and is compressed on movement of the clamp mechanism towards the unclamped position.

3. The steering column assembly according to claim 1 in which the damping member is located between the fixed cam part and the moving cam part.

4. The steering column assembly according to claim 3 in which one of the cam parts includes a cavity and the other cam part a protrusion that extends axially along the clamp pin and moves into the cavity as the cam part moves from a locked to an unlocked condition, and the resilient member is located within the cavity and is compressed by the fixed cam or moving cam or both as it reaches the unlocked condition.

5. The steering column assembly according to claim 4 in which the cavity comprises an annular well that has an axis coincident with an axis of the clamp pin, and the protrusion comprises a generally conical protrusion that also has an axis coincident with the axis of the clamp pin.

6. The steering column assembly according to claim 5 in which the resilient member is annular and is located in the well or is secured to the protrusion which is compressed as the protrusion moves further into the well.

7. The steering column assembly according to claim 4 in which the damping member is secured to a surface of the fixed cam or to the moving cam or to the clamp pin.

8. The steering column assembly according to claim 1 in which the damping member is located between the fixed cam part and the support bracket or shroud.

9. The steering column assembly according to claim 1 in which the damping member is located between the clamp pin and the shroud or the support bracket.

10. The steering column assembly according to claim 1 in which the damping member extends around the clamp pin.

\* \* \* \* \*